United States Patent [19]

Davitt et al.

[11] Patent Number: 5,392,343
[45] Date of Patent: Feb. 21, 1995

[54] ON DEMAND LANGUAGE INTERPRETATION IN A TELECOMMUNICATIONS SYSTEM

[75] Inventors: Michael Davitt, Berkley Heights; Alan N. Dunn, Randolph; Paula M. Goldstein, Aberdeen; Edgar J. Grijalva, North Bergen; Michael Neal, Lebanon; Christine P. Peterson, Fords; Christos I. Vaios, Shrewsbury, all of N.J.

[73] Assignee: AT&T Corp., Murray Hill, N.J.

[21] Appl. No.: 973,872

[22] Filed: Nov. 10, 1992

[51] Int. Cl.⁶ .......................................... H04M 3/42
[52] U.S. Cl. ................................. 379/212; 379/155; 379/213; 379/201; 379/127
[58] Field of Search .............. 379/155, 213, 201, 203, 379/142, 127, 94, 100, 212, 74, 75, 76, 77, 243, 244

[56] References Cited

U.S. PATENT DOCUMENTS

| | | | |
|---|---|---|---|
| 4,446,337 | 5/1985 | Cofer | 379/213 |
| 4,736,405 | 4/1988 | Akiyama | 379/201 |
| 4,797,910 | 1/1989 | Dandelin | 379/203 |
| 4,916,730 | 4/1990 | Hashimoto | 379/100 |
| 4,958,366 | 9/1990 | Hashimoto | 379/74 |
| 4,985,913 | 1/1991 | Shalom | 379/74 |
| 4,987,587 | 1/1991 | Jolissaint | 379/94 |
| 5,014,301 | 5/1991 | Maltezos | 379/155 |
| 5,029,196 | 7/1991 | Morganstein | 379/142 |
| 5,103,449 | 4/1992 | Jolissaint | 379/127 |

FOREIGN PATENT DOCUMENTS

| | | | |
|---|---|---|---|
| 0220652 | 11/1985 | Japan | 379/88 |
| 0146548 | 6/1988 | Japan | 379/89 |
| 0260253 | 10/1988 | Japan | 379/41 |

OTHER PUBLICATIONS

"AT&T Language Line Services", Consumer Communications Services, Jan. 1992, pp. 1-1 through 1-14.
VIP Debit Card, You will find it convenient even you speak in Taiwanese, China Times Feb. 28, 1992.

*Primary Examiner*—James L. Dwyer
*Assistant Examiner*—Michael N. Lau
*Attorney, Agent, or Firm*—Eugene S. Indyk; Mark K. Young

[57] ABSTRACT

Easily accessed and widely available language interpretation services are provided in a public switched telephone network by a common platform adjunct which automatically connects an interpretation services subscriber with a selected language interpreter associated with a language interpretation platform in the network. A subscriber dials, for example, an international telephone number which includes a code indicating that the call is an international call, a country code, a city code, and a local destination number. The ANI of the subscriber is detected and the call is routed to the adjunct which further verifies and validates the subscriber. The adjunct places a call through the public switched telephone network to the language interpretation platform. The call is answered either by an automatically preselected interpreter or by a human operator who causes the call to be manually transferred to a desired interpreter. The international call is completed to the destination and the calling subscriber, the interpreter, and the called party are bridged together.

23 Claims, 3 Drawing Sheets

ON DEMAND LANGUAGE INTERPRETATION IN A TELECOMMUNICATIONS SYSTEM

TECHNICAL FIELD

This invention relates to telecommunications between parties who speak different languages. More specifically, this invention relates to language interpretation services provided in a telecommunications system.

BACKGROUND

Today's telecommunication systems make it routine for persons from different countries to communicate with each other on a regular basis. Very often, however, the parties to such a call do not speak the same language. The usefulness of today's telecommunications systems could be greatly improved if there were some way to translate communications from one language to another in a telephone network.

There have been proposals to develop computers in telecommunication systems which can automatically translate voice communications from one language into another language. These efforts are currently in a somewhat rudimentary stage and are far from becoming a commercially practical reality.

In the meantime, AT&T offers a language interpretation service which is currently a part of the AT&T switched network. Known as the AT&T Language Line ® Service, it allows a caller to contact a human interpreter for assistance in making a telephone call expected to involve parties speaking different languages. The caller dials an 800 number to reach the service after which the caller gives his or her credit card or AT&T calling card number to an operator. An operator takes additional information from the caller about the call including the phone number of the called party and the languages expected to be spoken. The operator then connects the caller to a human interpreter fluent in the languages to be spoken during the phone call. The caller or operator completes the call to the called party resulting in a conference call between the caller, the called party, and the interpreter.

SUMMARY

Although AT&T's Language Line ® Service is a distinct and commercially significant improvement in the way telecommunications services are provided in today's networks, we have discovered that interpretation services provided by a telecommunications network can be markedly improved if the interpretation service were easier to access and if more people were able to partake of the service.

In this regard, there are two aspects of existing language interpretation services in telecommunications systems which can be improved. First, the amount and complexity of the information which must be entered into the telecommunications system to initiate and set up a phone call using the interpretation service is too great for convenient use of the service. Second, the requirement that only callers having credit cards or phone cards may use the service unduly limits the number of potential customers for the service. This invention provides a language interpretation service which is easier to use than existing language interpretation services. In particular, language interpretation is automatically made available for telephone calls initiated by conventional direct dialing procedures or by substantially similar procedures normally used to make a telephone call to a desired destination. No extra telephone numbers need to be used and billing for the services may be accomplished without a need for a credit card or a phone card.

In one example of the invention, a presubscribed caller is automatically given access to an interpretation service whenever a standard telephone call is made from a directory number associated with the subscriber stored in the network. No special 800 number must be dialed and the caller need not have a credit card or phone calling card. In another example of the invention, a caller may be given automatic access to an interpretation service by dialing a special prefix or suffix along with the direct dial telephone number of a called party.

There are just two examples of the invention, the full scope of which is defined in the claims appended to this application. Other examples of the invention will be apparent from the claims and the following detailed description of the preferred embodiments.

DETAILED DESCRIPTION

Figure 1:
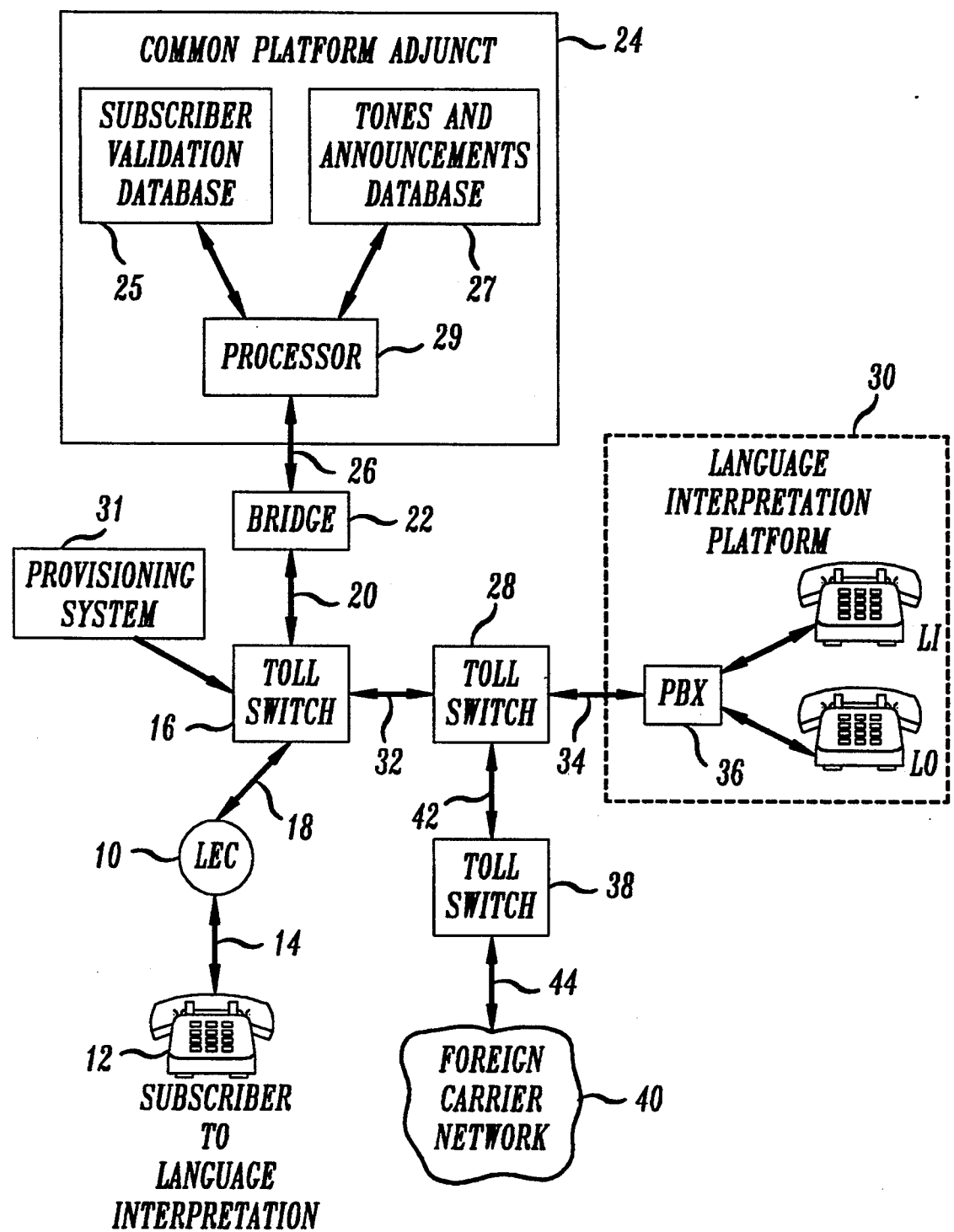
FIG. 1 is a block diagram of a public switched telephone network providing a language interpretation service in accordance with this invention.

FIG. 1 shows an example of a public switched telephone network architecture which may be used to implement various examples of this invention. FIG. 1 includes a schematic diagram of representative portions of a typical telecommunications network which includes a long distance public switched telephone network provided by a long distance carder such as AT&T. As shown in FIG. 1, entry into the long distance network is from a local public switched telephone network provided by a local exchange carder (LEC) such as one of the Regional Bell Operating Companies. In this example, the long distance public switched telephone network implements a language interpretation service in accordance with the invention, as described in more detail below. The language interpretation service could also be provided in one or more of the local public switched telephone networks such as those by which telephone customers typically gain access to long distance telephone networks.

The network shown in FIG. 1 includes a local public switched telephone network 10 which provides local telephone service to a number of telephone customers. One of those customers is a language interpretation service subscriber 12 shown in FIG. 1. The subscriber 12 is connected to the network 10 by a suitable subscriber line 14 which may provide a voice circuit and suitable signaling capability, such as dual tone multiple frequency (DTMF) signaling capability. The network 10 is connected to an originating toll switch 16 in the long distance network by means of a suitable trunk connection 18.

A line 20, which may be configured to operate as a primary rate interface (PRI), connects the switch 16 to a teleconference bridge 22 which will be used to create a conference between the subscriber 12, an interpreter, and a called party. The bridge 22 is connected to a common platform adjunct 24 by means of a suitable line 26. The adjunct 24 is a computer which effectuates the routing of calls through the network to connect the subscriber 12 with a called party and a language interpretation system in the network. The adjunct 24 may contain a subscriber validation data base 25 containing profiles of those who subscribe to the interpretation service. The adjunct 24 also may contain a tones and announcements database 27 containing announcements and tones by which the adjunct may send appropriate messages to the subscriber 12. The adjunct 24 may also contain a processor 29 which may have a voice recognition circuit which receives and acts upon voice responses from the subscriber. The processor 29 may also have detection circuitry which receives and acts upon signaling received from the subscriber 12. The processor 29 routes telephone calls through various parts of the network, and also selectively retrieves information from the database 25, selectively presents the announcements and tones from the database 27, and otherwise coordinates the activities of the adjunct 24 with the activities of the rest of the public switched network via the bridge 22. Although the adjunct 24 and bridge 22 are shown in FIG. 1 to be connected to the originating switch 16, those elements may be connected to any convenient switch in the network. In addition, although the bridge 22 is shown as a component separate from the adjunct 24 and the switch 16, it may also be implemented as a hardware or software structure in either the adjunct 24 or the switch 16.

The toll switch 16 is trunked to a toll switch 28 which acts as a terminating switch for a language interpretation platform 30. The switch 28 is connected to the switch 16 by means of a trunk connection 32. Although a single direct trunk connection 32 is shown in FIG. 1, there may be additional switches and other network circuit elements between the switch 16 and the switch 28 depending on the locations of the subscriber 12, the adjunct 24, the platform 30, and the called party.

The toll switch 28 is connected to the language interpretation platform 30 by means of a line 34 which could be, for example, a primary rate interface. A PBX 36 in the platform 30 is connected to line 34 and serves to route calls to an appropriate language interpreter LI. The PBX may be connected to any number of language interpreters only one of which is shown in FIG. 1. The PBX 36, in some examples of the invention, may be connected to one or more live operators LO who may facilitate the connection of the subscriber 12 to an appropriate language interpreter LI. The interpreters LI could reside at the PBX 36 as shown in FIG. 1 or they could reside at any other PBX or off a local switch in the network.

The toll switch 28 is connected to a toll switch 38 which acts as an international gateway between the domestic long distance network shown in FIG. 1 and one or more telephone networks operated by foreign carders, one of those networks being shown in FIG. 1 and given reference numeral 40. The toll switch 28 is connected to the international gateway toll switch 38 by means of a suitable trunk connection 42 which may or may not have additional switches and network elements between the toll switch 28 and the toll switch 38 depending on the relative locations of the switch 28, the platform 30 and the toll switch 38. The switch 38 is connected with the foreign network 40 via suitable transmission equipment 44.

The language interpretation features of the telephone network shown in FIG. 1 allow subscribers to receive language interpretation support for all direct dialed international voice calls, for example. Subscribers may place international voice calls using current international plain old telephone service (POTS) dialing procedures. In one example of the invention, users will presubscribe to the interpretation service. In other examples of the invention, end users will not have to presubscribe. In some examples of the invention, subscribers may initiate calls involving language interpretation from their own directory number or from other predefined telephone numbers such as those associated with certain public phones in airports or other transportation facilities. In addition, interpretation services may be obtained not only for international telephone calls, but also for domestic telephone calls known to involve parties speaking different languages, including toll-free domestic telephone calls.

Figure 2A:
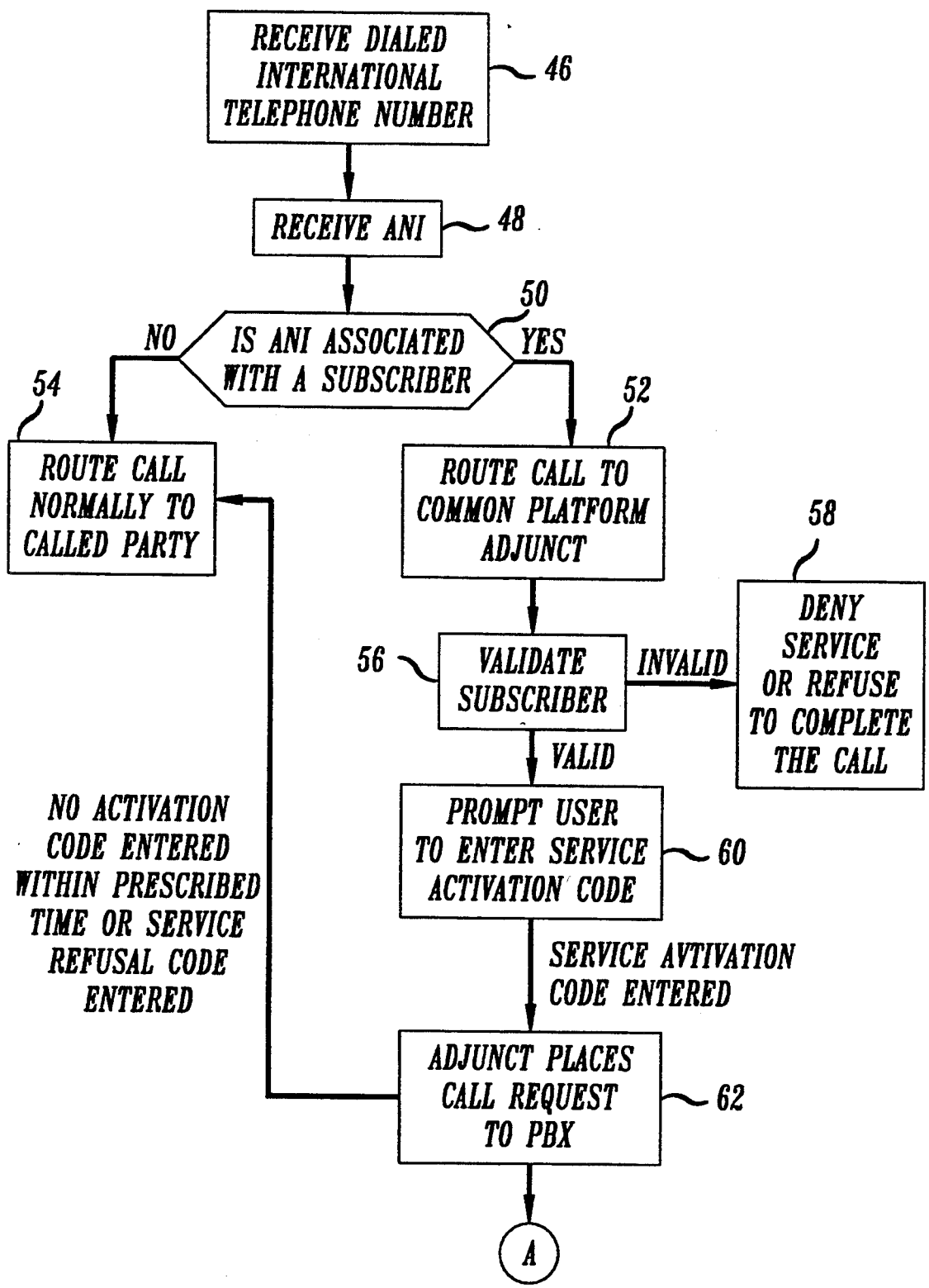
FIGS. 2A to 2D depict a flow chart representing an illustrative call flow for a language interpretation service provided by the network of FIG. 1.
Figure 2B:
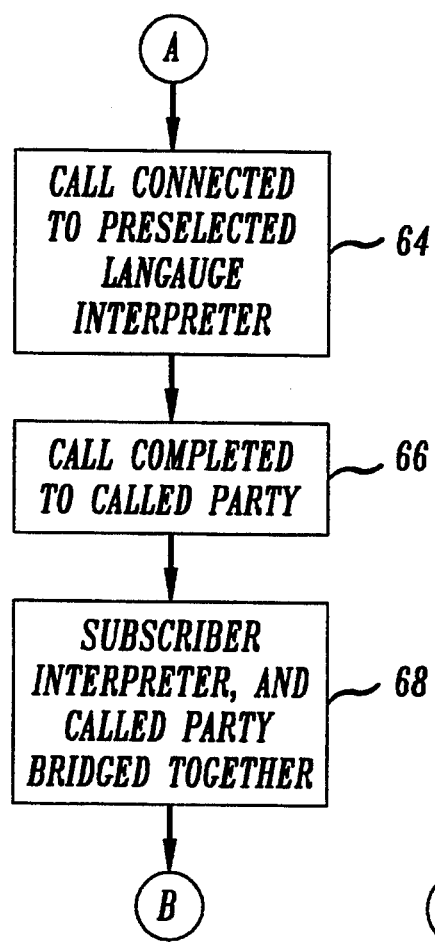

In one detailed example of the invention, shown in FIGS. 2A–2B, subscribers to language interpretation services will first dial a designation that the call will be an international call. For example, subscribers will first dial 011. Next, the subscriber will dial a country code indicating the country to which the phone call is to be directed and a national number representing the destination number of the called party. The numbers dialed by the subscriber are passed through the local public switched telephone network 10 and are received by the toll switch 16 in block 46. The toll switch 16 also receives and screens the subscriber's automated number identification (ANI) in block 48. In block 50, the switch 16 checks to see if this call is coming from a directory number which is stored in the switch 16 as having subscribed to the interpretation service. In this regard, the switch 16 is programmed by a provisioning system 31 (FIG. 1) with a list of telephone numbers representing those which are associated with subscribers to the interpretation service. If the switch 16 determines that the call is being made from a telephone number which is subscribed to the interpretation service, and the caller is thereby identified as an interpretation service subscriber, the call is routed by the switch 16 in block 52 to the adjunct 24. If the ANI is not identified as belonging to a subscriber, then the call is routed normally, as shown in block 54. The adjunct 24 will further validate the ANI in block 56 by checking suitable information stored in database 25. For example, the adjunct 24 may check a list of subscribers who have past due and unpaid bills. In some examples of the invention, entry of a password known only to the subscriber may be required. The adjunct 24 will check to see if the entered password is a password associated with a subscriber. If the subscriber is not validated, service is denied or the call is not completed, or both, as shown in block 58. If the subscriber is validated, the adjunct 24 may prompt the user in block 60, for example, by playing an announcement, for further information on call handling. The prompt of the subscriber can be either a tone (e.g., a "bong") or an announcement. An example of a suitable announcement would be an indication that the caller has reached an on-demand interpretation service. The announcement may state that the caller should enter a predetermined shorthand activation code indicating that the caller wishes to use the interpretation service. For example, the announcement may request that the caller press a certain sequence of buttons on a Touch Tone telephone such as the * key followed by one of the numerical keys. A plurality of different interpretation services may be offered and the subscriber may indicate a selection of one of those services by the code which he or she enters. The announcement may also indicate to the subscriber that he or she may forego the interpretation service by entering a service refusal code, for example, by pressing the # symbol on a Touch Tone telephone. Following the tone or the announcement, a timer is set by the adjunct 24. If the timer expires, for example, after a period of five seconds from the tone or announcement, the call will be handed over from the adjunct 24 to the toll switch 16 to be routed like a normal POTS call as shown in block 54 and the line between blocks 54 and 60 in FIG. 2A. If the subscriber signifies that he or she does not wish to use the interpretation service by entry of a service refusal code, the adjunct 24 will immediately hand the call over to the switch 16 for normal processing in block 54.

If the subscriber requests language interpretation by entry of the service activation code, the adjunct 24 will initiate a call request in block 62 to the PBX 36 in the language interpretation platform 30. To accomplish this, the adjunct 24 is preprovisioned with the destination number of the platform 30. The adjunct 24 sends a setup message to the PBX 36 including the directory number of the subscriber. The message may include the country code dialed by the subscriber and the national number of the called party. The phone call may be connected with a preselected language interpreter, as shown in block 64, in a number of different ways. The phone call from the adjunct 24 may be directed first to a live operator LO who may assist the caller in reaching a desired language interpreter. The country code alone or the combination of country code and city code may be used by the live operator LO to help determine which language interpreter should be used. In this regard, there may be circuitry in the PBX 36 which produces a list of languages displayed to the operator and likely to be spoken in the geographical area represented by the country code and city code. Alternatively, the call from the adjunct 24 may be automatically directed to an appropriate language interpreter LI without the intervention of a human operator LO. In this case, the language interpretation platform may include circuitry which detects the nature of the country code, city code, or both the country and city codes, and automatically brings an appropriate language interpreter LI to the phone call based on the predominant languages spoken in the geographical area represented by the country code and city code.

The call to the PBX 36 is routed via the bridge 22, the toll switch 26, and the toll switch 28. Upon receipt of a connect message, the human operator or the automatically ascertained language interpretor are bridged onto the call. If a human operator is connected, he or she will assist the subscriber in finding the desired language interpreter and, if needed, will collect any other needed information from the subscriber. Once the subscriber is validated and the language interpreter becomes available, the call is then transferred to the selected interpreter who is now bridged onto the call. At this point, conversation can take place between the subscriber and the interpreter during which the role played by the interpreter in the upcoming phone conversation with the called party may be determined. At the same time, billing for the services of the interpretation system may begin at the PBX 36. The billing for the interpretation services will be added to the billing for the actual telephone call. Since this service part of the call is billed by the PBX 36, the adjunct 24 must insure that the subscriber's destination number is delivered to the PBX 36 so that the bill for the interpretation service can appear on the regular bills relating to the caller's telephone. Alternatively, the switches or the adjunct 24 could produce a billing record.

Figure 2C:
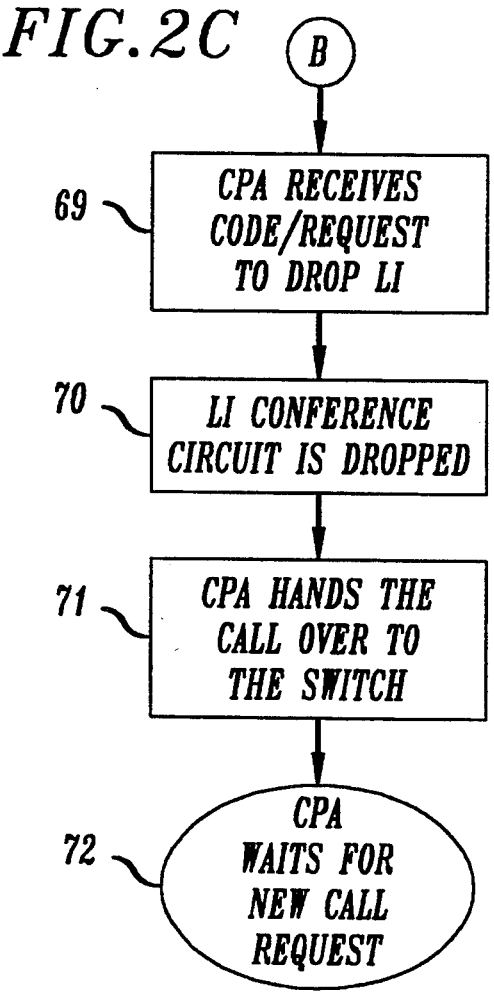
Figure 2D:
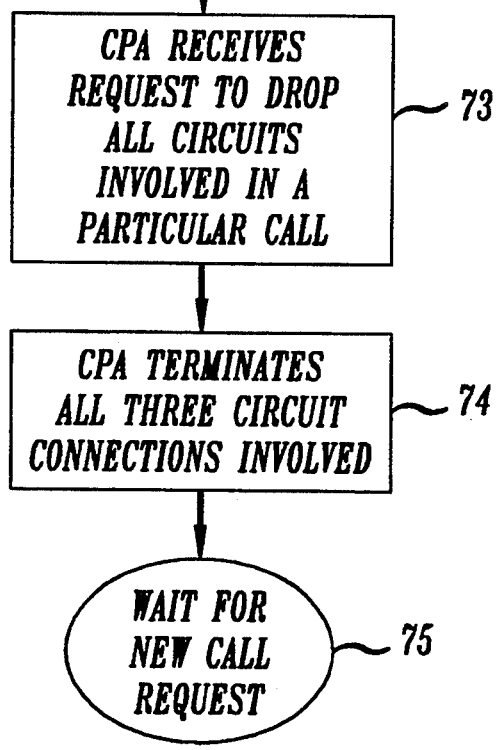

When the two-way conversation between the subscriber and the interpreter is concluded and it is agreed to complete the actual phone call to the called party, the subscriber or the language interpreter may trigger the adjunct 24 with a suitable signal which will cause the adjunct 24 to complete the international leg of the call setup, as shown in block 66 in FIG. 2B. The adjunct 24 will send, via the bridge 22, the subscriber dialed country code and national number to the toll switch 16 and toll switch 28 for further processing and routing to the international gateway switch 38 as an international POTS telephone call. At this point, bridging between the subscriber, the interpreter, and the switch 16 is considered to be activated, but waiting for cut-through to the international switch 38. When the country code and national number are received by the switch 16 from the adjunct 24, the rest of the switches between the switch 16 and the switch 38 will route the call to the switch 38 and thereafter to the foreign carder network 40. The set-up of the call is considered complete when a cut-through message is received. The ultimate result is that them is a conference call created by bridging the subscriber, the interpreter, and the called party, as shown in block 68. Once the conference call has been created in block 68, the adjunct 24 may receive a request from one of the conference participants to drop the interpreter from the conference in block 69 in FIG. 2C. The adjunct 24 then drops the part of the conference circuit connecting the language interpreter to the conference in block 70. The adjunct then hands the call over to the switch in block 71 and waits for a new call request in block 72. At the end of the phone call, the adjunct receives a request to drop all circuits involved in that particular call as shown in block 73 in FIG. 2D. The adjunct terminates all the circuit connections involved in the call in block 74 and waits for a new call request in block 75. Call disconnect will occur on receipt of an on-hook signal from a subscriber. This on-hook signal will trigger the adjunct 24 to release the connection to the PBX 36 and toll switches 16, 28, and 38. The interpreter is able to drop off from the call at any time without terminating the call. In addition, the call could be handed over to an appropriate switch in the network at any moment if one of the end users determine that there is no need for language interpretation. This handover to a switch can be initiated by the originator of the call, for example, by dialing the * key on a Touch Tone telephone.

The interpretation services provided by this invention may be obtained for any direct dialed international calls originating from residential or other sources in any country. In addition to having this service available from a subscriber's own telephone number, the service may also be made available to subscribers from selected other locations, for example, from certain airport telephones and the like. The service may even be made available to certain non-subscribers who use toll-free services such as the international inbound services, known as I-800 services. In these situations, the telephone numbers of these other phones will be screened in block 48 in the same manner that the telephone numbers of the subscribers are screened in the example of the invention described above. In addition to a list of acceptable telephone numbers from which interpretation services may be obtained, the adjunct 24 will also have a lookup table of subscriber codes associated with the normal directory numbers of the subscribers and individual passwords/I.D.'s. When a subscriber wishes to use the interpretation service from a telephone other than his or her normal telephone, the subscriber will be prompted in the course of performing the validation in block 56 to enter his or her normal destination number followed up a multi-digit access code. Upon successful validation by the adjunct 24, the call processing may proceed in the same manner as in the example of the invention described above.

In a menu-driven example of this invention, the subscriber dials the destination number of the phone call in block 46 and is given the previously described tone or announcement in block 60 relating to entry into the interpretation service. The subscriber then indicates a desire to enter the service as described above by entry of an activation code. In connection with performing the call connection of block 64, an automated voice system in the platform 30 answers and provides the subscriber with a menu of languages to Choose from based on the country code and city code entered by the subscriber. For example, in a call to Strasbourg, France, the subscriber may be provided with the option of choosing either a French interpreter or a German interpreter. In a call to Switzerland, the option of choosing a French, German, or Italian interpreter may be given. Selection is made by pressing certain dialing codes on the subscriber's telephone. The subscriber may be given another code to select if he or she desires personal assistance from a human operator. Voice recognition circuitry may be provided in the language interpretation platform 30 so that a subscriber may make a selection of interpreter by voice command rather than by entry of codes into his or her telephone.

In yet another example of the invention, the subscriber may be permitted to enter an additional code after entry of the service activation code to indicate a selection of an interpreter dealing in a desired language. In this situation, the subscriber may be given the opportunity of reaching a human operator by dialing an additional code after entry of the activation code.

There may also be stored in a subscriber's profile in the database 24 that this subscriber normally wishes to use an interpreter fluent in a particular language. The subscriber will then be automatically connected to such interpreter each time the subscriber uses the interpretation services.

In an additional variation of the invention, a caller keys in an international telephone number and a special short hand designation, .such as the designation produced by depressing the * key on a Touch Tone telephone. In one example, the special designation may be a prefix dialed before the international telephone number is dialed and in another example, the special designation may be a suffix dialed after the international number is dialed. The designation causes the caller to be automatically connected to an interpretation services in the network. The platform may detect the country code in the international telephone number and route the call to an interpreter who speaks English and the predominant language spoken in the country represented by the entered country code. The telephone number from which the call was initiated will be billed for the interpretation service and the international phone call. The interpreter may complete the phone call and remain bridged onto the call to provide language translation for the call as in other examples of the invention.

An interpretation service in accordance with this invention could be configured to route calls to interpreters residing in foreign networks. For example, calls could be routed to interpreters connected with PTT's or AT&T's Global Network. Collect calls could be handled by provision of a common platform adjunct having a data base to validate the called party and play appropriate announcements to the called party.

Although a number of preferred embodiments have been described above, it should be apparent that there are other embodiments within the scope of the following claims.

We claim:
1. A telecommunications apparatus, comprising:
    means for receiving signals associated with a telephone call between a caller and called party, the signals comprising at least a telephone number of the caller and a
    means for detecting a predetermined characteristic of the caller's telephone number and, and in response to the predetermined characteristic of the caller's telephone number, automatically directing the telephone call to a spoken language interpretation service which is capable of providing preselected spoken language interpretation to the caller and called party during the telephone call.

2. A method of providing spoken language interpretation service in a public switched telephone network comprising the steps of:
    receiving signals associated with a telephone call between a caller and a called party, the signals comprising at least the caller's telephone number and the called party's telephone number; and
    automatically providing a spoken language interpretation service to the caller and the called party during the telephone call in response to a predetermined characteristic of the caller's telephone number.

3. The method of claim 2, in which the predetermined characteristic is whether or not the caller's telephone number is stored in the network as a telephone number associated with a subscriber to the interpretation service.

4. The method of claim 3, in which providing step comprises the step of automatically routing the telephone call to a common platform adjunct in response to a determination that the caller's telephone number is a telephone number associated with a subscriber to the interpretation service.

5. The method of claim 4, in which the providing step further comprises the step of validating the subscriber.

6. A method of providing a spoken language interpretation service in a public switched telephone network to a caller and a called party during a telephone call, comprising the steps of:
    receiving signals associated with a telephone call between a caller and a called party, the signals representing at least the caller's telephone number and the called party's telephone number; and
    automatically offering spoken language interpretation service to the caller if the caller's telephone number is stored in the network as a telephone number associated with a subscriber to the spoken language interpretation service by sending a message to the caller giving the caller an option to activate the spoken language interpretation service.

7. The method of claim 6, in which the providing step further comprises the step of receiving a message from the subscriber indicating a desire to activate the interpretation service and automatically routing the telephone call to a language interpretation platform in the network.

8. The method of claim 7, in which the providing step further comprises the step of receiving the telephone call in the language interpretation platform and connecting the telephone call to a language interpreter desired by the subscriber.

9. The method of claim 8, in which the step of receiving the telephone call in the platform comprises the step of connecting the telephone call to a human operator and transferring the call from the human operator to a language interpreter desired by the subscriber.

10. The method of claim 8, in which the step of receiving the telephone call in the platform comprises the step of automatically connecting the telephone call to a desired language interpreter in response to a predetermined characteristic of the telephone number of the called party.

11. The method of claim 10, in which the predetermined characteristic of the telephone number of the called party is a country code.

12. The method of claim 2, in which the public switched telephone network is a long distance telephone network.

13. The method of claim 2, in which the public switched telephone network is a local telephone network.

14. The method of claim 4, in which the providing step includes the step of routing the telephone call to a language interpreter desired by the caller.

15. The method of claim 14, in which the providing step further comprises the steps of:
routing the telephone call to the called party; and
bridging together the caller, the language interpreter, and the called party.

16. The method of claim 2, in which the telephone call is an international telephone call.

17. The method of claim 2, in which the telephone call is an domestic telephone call.

18. The method of claim 2, further comprising the step of:
receiving an additional caller's telephone number; and
in which the providing step includes the step of responding to the first mentioned caller's telephone number and the additional caller's telephone number to determine whether or not the first mentioned caller's telephone number is associated with a predetermined telephone from which language interpretation service may be obtained and to determine whether or not the additional caller's telephone number is associated with a subscriber to the language interpretation service.

19. The method of claim 2, in which the providing step includes the step of sending a menu of choices to a caller relating to languages spoken by language interpreters available to assist the caller.

20. The method of claim 2, in which the providing step includes the step of automatically muting the telephone call to a language interpreter previously selected by a subscriber for automatic connection to the subscriber each time the subscriber uses the language interpretation services.

21. A method of providing spoken language interpretation in a public switched telephone network, comprising the steps of:
receiving a telephone call comprising signals representing a called party's telephone number and a short hand designation appended to the called party's telephone number representing a request for spoken language interpretation; and
automatically providing spoken language interpretation in response to the called party's telephone number and the short hand designation.

22. The method of claim 21, in which the short hand designation is a suffix appended to the called party's telephone number.

23. The method of claim 21, in which the short hand designation is a prefix appended to the called party's telephone number.

* * * * *